(12) United States Patent
Krasucki et al.

(10) Patent No.: US 12,553,067 B2
(45) Date of Patent: Feb. 17, 2026

(54) GRAIN FRACTIONATION PROCESS

(71) Applicant: BGW Sp. z o.o., Poznan (PL)

(72) Inventors: Piotr Krasucki, Palmetto, FL (US); Bartosz Boguslaw Walkowiak, Poznan (PL)

(73) Assignee: BGW Sp. z o.o., Poznań (PL)

( * ) Notice: Subject to any disclaimer, the term of this patent is extended or adjusted under 35 U.S.C. 154(b) by 0 days.

(21) Appl. No.: 19/023,930

(22) Filed: Jan. 16, 2025

(65) Prior Publication Data

US 2025/0179536 A1    Jun. 5, 2025

Related U.S. Application Data

(63) Continuation of application No. PCT/US2024/058695, filed on Dec. 5, 2024.

(60) Provisional application No. 63/606,386, filed on Dec. 5, 2023.

(51) Int. Cl.
| | |
|---|---|
| *C12P 19/16* | (2006.01) |
| *C08B 30/00* | (2006.01) |
| *C12P 7/10* | (2006.01) |
| *C13K 1/00* | (2006.01) |

(52) U.S. Cl.
CPC ............. *C12P 7/10* (2013.01); *C12P 2201/00* (2013.01)

(58) Field of Classification Search
CPC .. C12P 19/16; C12P 7/10; C12M 1/33; C13K 1/00; C08B 30/00
See application file for complete search history.

(56) References Cited

U.S. PATENT DOCUMENTS

| | | |
|---|---|---|
| 9,732,302 B2 | 8/2017 | Lee |
| 9,777,303 B2 | 10/2017 | Jakel et al. |
| 10,113,007 B2 | 10/2018 | Kohl |
| 10,119,157 B2 | 11/2018 | Jakel et al. |
| 10,260,031 B2 | 4/2019 | Gallop et al. |
| 10,480,038 B2 | 11/2019 | Jakel et al. |
| 10,774,303 B2 | 9/2020 | Dieker et al. |
| 2010/0173358 A1 | 7/2010 | Witt et al. |
| 2012/0156738 A1 | 6/2012 | Anton et al. |
| 2014/0315259 A1 | 10/2014 | Woods et al. |
| 2015/0136121 A1 | 5/2015 | Jansen et al. |
| 2020/0095615 A1 | 3/2020 | Deinhammer et al. |

FOREIGN PATENT DOCUMENTS

EP      0176621     *   5/1984

* cited by examiner

*Primary Examiner* — Maryam Monshipouri
(74) *Attorney, Agent, or Firm* — Sandberg Phoenix & von Gontard, P.C.

(57) ABSTRACT

Disclosed herein are processes for separating liquefied grains prior to a fermentation. The described processes enable separation of insoluble biomass solids from soluble carbohydrates to yield at least one biomass solids fraction and at least one carbohydrates-rich fraction. The process involves an initial dilution step where liquefied grains are combined with either water or a recycled soluble matter stream, the latter comprising an aqueous solution of residual carbohydrates recovered from a first bioprocessing stage. The diluted liquid mash undergoes a first fractionation stage involving mechanical processing, yielding two distinct streams: a first retentate stream containing insoluble biomass solids and residual carbohydrates, and a permeate stream containing dissolved carbohydrates. The first retentate stream is then mechanically processed in a first bioprocessing stage, resulting in two outputs: a processed first retentate stream containing the insoluble biomass solids, and the recycled soluble matter stream containing residual carbohydrates. The process culminates in the collection of dissolved carbohydrates and insoluble biomass solids, which constitute the carbohydrates-rich fraction and biomass solids fraction, respectively. These processes provide efficient separation of grain components to yield extremely clean fermentation medium for ethanol and useful biomass solid products untainted by fermentation processes.

7 Claims, 4 Drawing Sheets

GRAIN FRACTIONATION PROCESS

CROSS-REFERENCE TO RELATED APPLICATIONS

This application is a continuation of PCT Patent Application No. PCT/US2024/058695, filed Dec. 5, 2024, which claims priority to U.S. Provisional Application No. 63/606,386 filed Dec. 5, 2023, the content of said applications being incorporated by reference herein.

FIELD

The present teachings relate to fractionation and processing methods for fermentation.

BACKGROUND

The statements in this section merely provide background information related to the present disclosure and may not constitute prior art.

Bioprocessing agricultural feedstock through fermentation requires specialized fermentation media that balance cost, composition, and nutrient distribution. These media must also maintain suitable rheological properties for process control while avoiding properties that make downstream processing and product purification economically unfeasible.

The growing and continued development of natural and genetically modified microbes enables production of increasingly diverse molecules, supporting the transition to renewable resources. Large-scale industrial fermentation, such as ethanol production, relies on inexpensive agricultural grains as sources of energy, nutrients, and molecular building blocks. These fermentation media primarily comprise complex carbohydrates (energy and carbon source), proteins (nitrogen source), and fiber (phosphorous source), all requiring conversion into simpler compounds for microbial utilization.

For example, complex carbohydrates that provide glucose are present as starch granules within grain particles' protein matrix. These particles are produced through milling technologies to achieve an ideal size distribution. While industrial ethanol production can handle unrefined media with high insoluble solids content, such media pose challenges for other fermentation processes, requiring complex product separation. The presence of insoluble solids can make downstream separation and purification prohibitively expensive and can even result in product loss.

Creating agricultural grain-based fermentation media with specific nutrient concentrations but without generating undesirable solid byproducts is a challenge that has yet to be solved. Eliminating any undissolved solids like biomass solids in carbohydrate-rich fermentation media is crucial for improved process control, higher density fermentations, and enhanced product separation.

The increasing production of various bioproducts-including organic acids (like lactic and succinic acid), transportation fuels (such as ethanol and butanol), microbial derived coproducts and food/feed ingredients (like yeast biomass and protein meals)-requires renewable, grain-based media. Currently, dry and wet grain milling are the primary bioprocessing methods, with wet milling being more complex but yielding higher-purity products including food products, alcohol, gluten meal, gluten feed, starch, oil, and syrup. Dry milling primarily produces various grades of grain flours for processes like ethanol fermentation.

What is needed, then, are methods for production of glucose-rich fermentation media with minimal insoluble materials from dry-milled grains, suitable for producing ethanol, biomass, metabolites, and other small molecules through microbial metabolism. Additionally, such process should enable production of high-purity protein and fiber streams. By achieving such separation and creating a high purity fermentation medium, one can incorporate the methods described herein into existing industrial plants and use genetically-modified microbial biomass to produce a wide array of products without fear of contamination of the other output streams, such as those comprising recovered biomass solids.

SUMMARY

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

The process described herein describes how to separate (fractionate) liquefied grains into at least two parts: a biomass solids fraction and a carbohydrates-rich fraction. The liquefied grains initially contain both insoluble biomass solids and soluble carbohydrates. The process begins by diluting the liquefied grains to create a diluted liquid mash. This dilution can be done using either water or a recycled soluble matter stream. The recycled stream is an aqueous solution containing residual carbohydrates that have been recovered from a first bioprocessing stage.

Next is the first fractionation stage, where the diluted liquid mash is mechanically processed. This processing separates the material into two streams: a first retentate stream (containing the insoluble biomass solids and residual carbohydrates) and a permeate stream (containing the dissolved carbohydrates). The first retentate stream then undergoes mechanical processing in a first bioprocessing stage. This produces two outputs: a processed first retentate stream (containing the insoluble biomass solids) and the recycled soluble matter stream (containing the residual carbohydrates) mentioned earlier.

Finally, the process involves two collection steps: gathering the dissolved carbohydrates to create the carbohydrates-rich fraction, and gathering the insoluble biomass solids to create the biomass solids fraction.

The quantity of liquefied grains can exist as a suspension, with the insoluble biomass solids making up between 25% and 45% of its total mass. In the final product, the carbohydrates-rich fraction can contain less than 1% insoluble biomass solids by mass.

The process can include additional steps such as when the permeate stream contains a small volume of undissolved solids. In this case, there is a second fractionation stage where the permeate stream is mechanically processed to produce two outputs: a second retentate stream (containing the small volume of undissolved solids and trace carbohydrates) and a first soluble matter stream (containing the dissolved carbohydrates). The second retentate stream then undergoes mechanical processing in a second bioprocessing stage, yielding a processed second retentate stream (containing the undissolved solids) and a second soluble matter stream (containing the trace carbohydrates). This second soluble matter stream is then channeled to the first bioprocessing stage for processing with the first soluble matter stream.

The process can be further extended by combining and mechanically processing both the processed first retentate stream and the second processed retentate stream in a third bioprocessing stage. This produces a combined retentate stream (containing the insoluble biomass solids) and a third soluble matter stream. The third soluble matter stream is then channeled to the first bioprocessing stage for processing along with the first and second soluble matter streams.

The biomass solids fraction may include either a fiber fraction or a protein fraction, and the carbohydrate fraction typically contains glucose.

The processes described herein can be part of a larger method for producing ethanol or other microbially derived metabolic products (including proteins, vitamins, and other molecules). This broader method begins with milling dry grain into flour, mixing this flour with process liquids to create the liquefied grains (containing insoluble biomass solids and soluble carbohydrates), then applying the fractionation process described above, and finally fermenting the carbohydrates-rich fraction to produce ethanol and other desirable products such as proteins, vitamins, and acids. This fermentation process can be accomplished using genetically modified microbial biomass, and notably, there is no need for any recovery operation for undissolved biomass solids from the carbohydrates-rich fraction.

Also described herein is a general method for separating liquefied grains into two principal parts: a biomass solids fraction, which is a fraction containing all grain residues, and a carbohydrate-rich fraction. These principal parts can be refined further to obtain additional fractions. This separation happens through multiple connected loops in series, starting with a first fractionation loop followed by one or more refining fractionation loops. In exemplary embodiments that feature only one refining fractionation loop, the refining fractionation loop can be considered both the 'first' and 'final' refining fractionation loop.

The first fractionation loop begins with a liquid mash input and involves several steps. Initially, this liquid mash input is combined with a process waters stream to create a dilute liquid mash, which is then mechanically separated into a carbohydrates output and a retentate stream. The retentate stream undergoes bioprocessing, where it's mixed with both a combined waters stream and a residual waters stream (the latter coming from the first refining fractionation loop in the series). This mixture creates a mixed retentate stream, which is mechanically separated into a process waters stream and a biomass stream. The process waters stream cycles back to the beginning of the fractionation step, while the output, which contains residual carbohydrates, moves forward into the next loop in the series.

The refining fractionation loops each have their own sequence. They start with an input that varies depending on their position in the series; the first loop receives the carbohydrates output (which includes residual carbohydrates) from the initial fractionation loop, while subsequent loops receive the refined carbohydrates output from the loop before them. Each loop performs a mechanical separation to produce a refined carbohydrates output (which includes residual carbohydrates) and a residual retentate stream. The processing of this residual retentate stream differs depending on whether it's in the final loop or not. In non-final loops, it's mixed with residual waters from the next loop to create a mixed residual retentate stream, which is then separated into a residual waters stream and a residual biomass stream. In the final loop, the residual retentate stream is directly separated into these components.

The residual waters follow a specific flow pattern: from the first refining loop, they go back to the first fractionation loop, while in subsequent loops, they flow back to the previous refining loop.

The process culminates in several key outputs: the refined carbohydrates output from the final refining fractionation loop becomes the carbohydrates-rich fraction, while the biomass streams from all loops are combined and then mechanically separated into a combined retentate stream (which becomes the biomass solids fraction) and a combined waters stream (which returns to the bioprocessing step in the first fractionation loop). Each fraction can be refined further to obtain higher quality fractions.

The quantity of liquefied grains in the more generalized process described above can exist as a suspension, with the insoluble biomass solids making up between 25% and 45% of its total mass. In the final product, the carbohydrates-rich fraction can contain less than 1% insoluble biomass solids by mass.

The generalized process described herein can be part of a larger method for producing ethanol or other microbially derived metabolic products (including proteins, vitamins, and other molecules). This broader method begins with milling dry grain into flour, mixing this flour with process liquids to create the liquefied grains (containing insoluble biomass solids and soluble carbohydrates), then applying the fractionation process described above, and finally fermenting the carbohydrates-rich fraction to produce ethanol. This fermentation process can be accomplished using genetically modified microbial biomass, and notably, there is no need for any recovery operation for undissolved biomass solids from the carbohydrates-rich fraction.

BRIEF DESCRIPTION OF DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
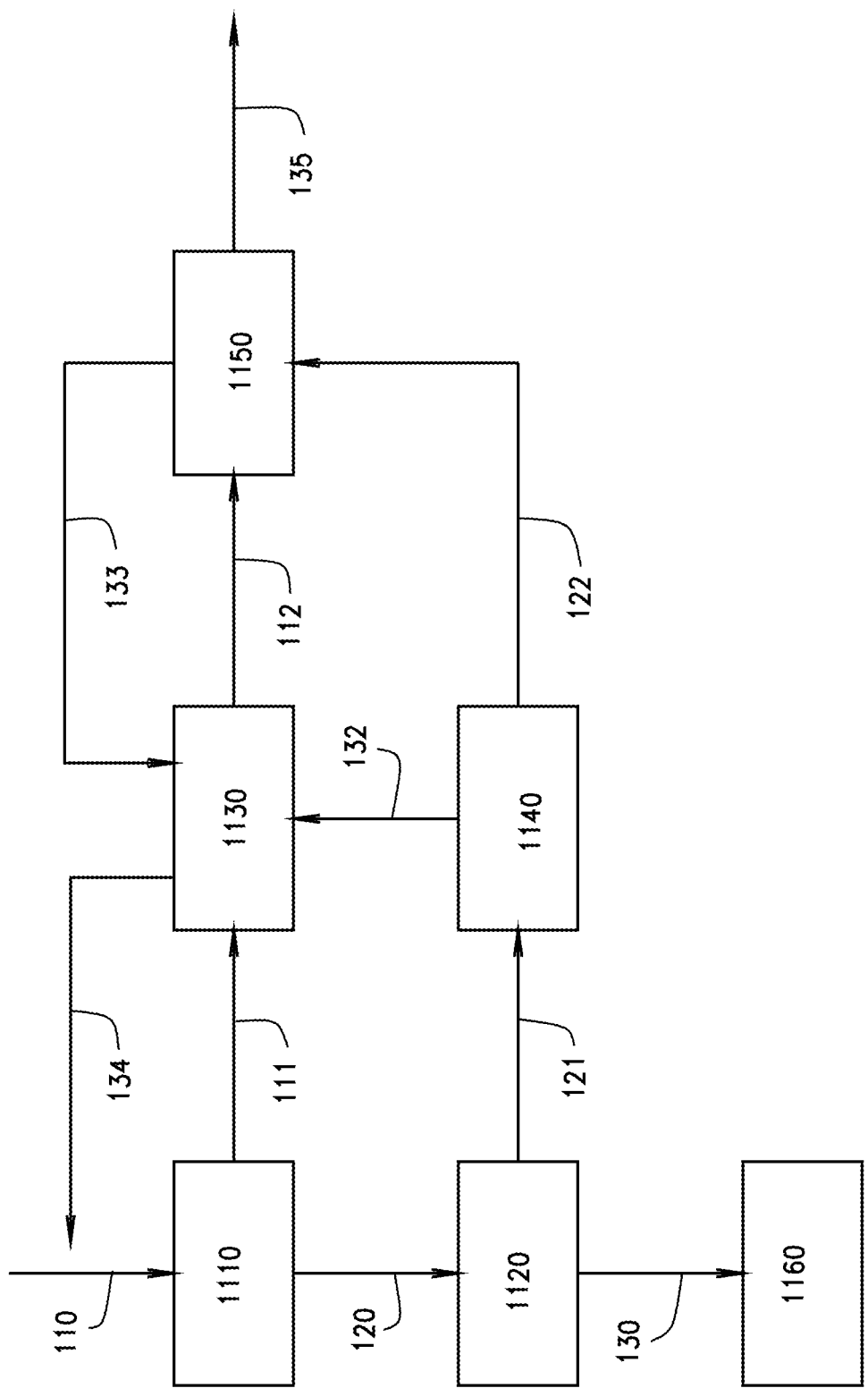
FIG. 1 is a schematic representation of the grain fractionation process of the present description according to various exemplary embodiments.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

As used herein, the terms 'liquefying' and 'liquefaction' are used interchangeably to refer to the process where grain starches are broken down into shorter glucose chains and dextrins, often through the application of heat and/or enzymes, converting the grain mash from a thick slurry into a thinner, more fluid consistency suitable for fermentation.

As used herein, the term "centrifugal sieve" refers to a device that separates particles by size screen element, wherein centrifugal force drives material against the screen while paddles, impellers, or other mechanical elements move the material along the screen surface to facilitate separation of particles that pass through the screen openings from those that do not. Centrifugal sieves in the present context are designed to maximize carbohydrates & glucose yield. Pulp is generally placed on a rotating sieve in order to permit the passage of carbohydrates & glucose but block biomass solids such as fiber.

As used herein, the term "decanter centrifuge" refers to a device that continuously separates components of different densities in a mixture using centrifugal force generated by a rotating bowl, wherein the separated denser material is conveyed at a different speed relative to the bowl to enable continuous discharge of both the denser and lighter fractions.

As used herein, the term "dewatering device" refers to an apparatus that removes water or other liquid from a wet material through mechanical, thermal, or other physical means to increase the solids content of the material and produce separate liquid and dewatered solid fractions.

As used herein, the term "fractionation" refers to any process that separates components of a physical mixture by exploiting the physical and/or chemical properties of those components.

As used herein, the term "mixer" refers to any apparatus that combines two or more substances into a mixture.

As used herein, the term "process liquids" refers to fluids used in or generated during industrial operations, including but not limited to water, solvents, suspensions, solutions, and mixtures thereof, which may contain dissolved or suspended materials and serve as diluents, carriers, or waste streams in the process. In the present context, process liquids typically refer to water comprising small amounts of carbohydrates, biomass solids, or both, but can also refer to pure water or tap water.

As used herein, the term "retentate" refers to a portion of a feed mixture that does not pass through a separation barrier (such as a screen, membrane, or filter) during a separation process, consisting of materials that are retained based on size, molecular weight, density, or other physical properties.

Unlike traditional ethanol processes designed to maximize the production of ethanol, distiller's grains, and corn oil, the methods disclosed herein and their embodiments describe a process that fundamentally shifts the mass balance of a typical dry milling-dependent ethanol plant. Rather than focusing on these conventional products, the methods of the present disclosure significantly reduce distiller's grains production while generating a fermentation medium that is almost entirely free of suspended solids. This elimination of suspended solids in the fermentation medium enables the implementation of advanced fermentation processes aimed at producing higher-value products such as organic acids, higher alcohols, biomass, other coproducts and food and feed ingredients with precisely controlled elemental composition.

These advanced fermentation processes require a clean fermentation medium, free from solids and other components that would otherwise make them economically unfeasible. The methods described herein facilitate the modification of existing dry milling-dependent ethanol plants, enabling them to produce advanced fermentation products through simplified recovery operations, unencumbered by the presence of suspended solids in the initial fermentation medium.

The focus of the methods described herein is on implementing process technology that enables the separation and removal of various solid fractions obtained through the dry milling process from a principal carbohydrate-containing fraction while maintaining overall water conservation through recycling. The removal of solids, while retaining the principal dissolved carbohydrate fraction, allows this fraction to be directly incorporated into the fermentation medium. This technological advancement represents a significant shift in ethanol plant operation, opening new possibilities for diversified product streams and improved process economics.

The present disclosure generally provides a fermentation process that incorporates fractionation of the components of agricultural fermentation stock prior to downstream processing. The key grain fractionation process (GFP) described herein is illustrated in a generalized way in the schematic of FIG. 1.

FIG. 1 shows the GFP beginning with a liquid mash 110. The liquid mash 110 results from liquefaction of an agricultural product, such as grain flour, where grain particles are broken down and form a fluid mixture. The liquid mash 110 comprises particles of the grain flour that are of various sizes. In various exemplary embodiments, the liquid mash 110 is mixed during its preparation with a recycled soluble matter stream 134 that is generated later in the GFP process as part of a closed loop, resulting in a diluted liquid mash. The liquid mash 110 or the diluted liquid mash then undergoes a first fractionation stage 1110, during which the liquid mash 110 is mechanically separated into two separate streams: a first retentate stream 111 and a permeate stream 120. The permeate stream 120 principally comprises soluble simple carbohydrates such as glucose and a small volume of undissolved grain solids and other small particles. The first retentate stream 111 principally comprises insoluble biomass solids and other insoluble particles. Generally, the first retentate stream also comprises a concentration of soluble carbohydrates. The amount of soluble carbohydrates present in the retentate stream 111 is proportional to the volume of the liquid mash 110.

The permeate stream 120 proceeds to a second fractionation stage 1120, during which the permeate stream 120 undergoes mechanical separation to produce a second retentate stream 121 and a first soluble matter stream 130. The first soluble matter stream 130 principally comprises soluble carbohydrates such as glucose. In various exemplary embodiments, the first soluble matter stream 130 does not comprise undissolved grain solids. The first soluble matter stream 130 is received as a product of the GFP and referred to as a glucose rich medium 1160. The glucose rich medium 1160 can be used as-is or incorporated into various downstream processes to obtained even higher purity carbohydrate steams. The second retentate stream 121 comprises a small volume of undissolved grain solids and other small particles as well as some residual carbohydrates, such as glucose, that have been mechanically separated from the permeate stream 120.

The first retentate stream 111 proceeds to a first bioprocessing stage 1130. The first bioprocessing stage 1130 separates and recovers the concentration of soluble carbohydrates, such as glucose, from the first retentate stream 111, leaving a processed first retentate stream 112 that comprises primary insoluble biomass materials. In various exemplary embodiments, the first bioprocessing stage 1130 involves passing the first retentate stream 112 through typically a three-stage or single stage or double stage or quad-stage counter-current washing system, where process waters or fresh wash water flows in an opposite direction to the movement of the first retentate stream 112. In this system, the cleanest wash water contacts the most-washed solids in the final stage, while the most contaminated wash water contacts the fresh, unwashed solids in the first stage, creating three sequential equilibrium points. The counter-current flow maximizes the recovery of dissolved materials from the solids while minimizing the total wash water required for effective separation. The soluble carbohydrates leave the first bioprocessing stage 1130 as the recycled soluble matter stream 134. Thus, the recycled soluble matter stream 134 is, in various exemplary embodiments, an aqueous stream comprising a concentration of soluble carbohydrates. The recycled soluble matter stream 134 can re-enter the GFP process by joining the liquified mash 110 during its preparation, as shown in FIG. 1, or it can be integrated into other processes as desired.

The second retentate stream 121 proceeds to a second bioprocessing stage 1140. The second bioprocessing stage 1140 separates and recovers the concentration of soluble carbohydrates, such as glucose, from the second retentate stream 121, leaving a processed second retentate stream 122 that comprises residual insoluble biomass materials. In various exemplary embodiments, the second bioprocessing stage 1140 involves passing the second retentate stream 122 through a three-stage counter-current washing system, where fresh wash water flows in an opposite direction to the movement of the second retentate stream 121. In this system, the cleanest wash water contacts the most-washed solids in the final stage, while the most contaminated wash water contacts the fresh, unwashed solids in the first stage, creating three sequential equilibrium points. The counter-current flow maximizes the recovery of dissolved materials from the solids while minimizing the total wash water required for effective separation. The soluble carbohydrates leave the second bioprocessing stage 1140 as a second soluble matter stream 132. The second soluble matter stream 132 then proceeds to the first bioprocessing stage 1130, as shown in FIG. 1. The second soluble matter stream 132 is processed in the first bioprocessing stage 1130 in the same manner that the first retentate stream 111 is processed in the first bioprocessing stage 1130.

The processed first retentate stream 112 containing primary insoluble solid biomass materials and the processed second retentate stream 122 containing residual solid biomass materials both proceed to a third bioprocessing stage 1150. The third bioprocessing stage 1150 separates out any remaining dissolved carbohydrates as a third soluble matter stream 133 and integrates the first processed retentate stream 112 and the second processed retentate stream 122 to achieve a combined retentate stream 135. The combined retentate stream 135 is an integrated undissolved solids-rich stream that primarily comprises protein and fiber materials. In various exemplary embodiments, the combined retentate stream 135 does not comprise carbohydrates such as glucose. The third soluble matter stream 133 proceeds to and is processed in the first bioprocessing stage 1130 in the same manner that the first retentate stream 111 is processed in the first bioprocessing stage 1130. The combined retentate stream 135 can be processed to obtain separation of protein and fiber fractions.

As the above description of the GFP is highly generalized, a person of ordinary skill in the art could envision variations in the process that are considered to be within the scope of the present description. For example, the first bioprocessing stage 1130, the second fractionation stage 1120, and the second bioprocessing stage 1140 can separate soluble carbohydrates and insoluble matter by any means known to one of ordinary skill in the art.

EXAMPLES

Example 1

Figure 2:
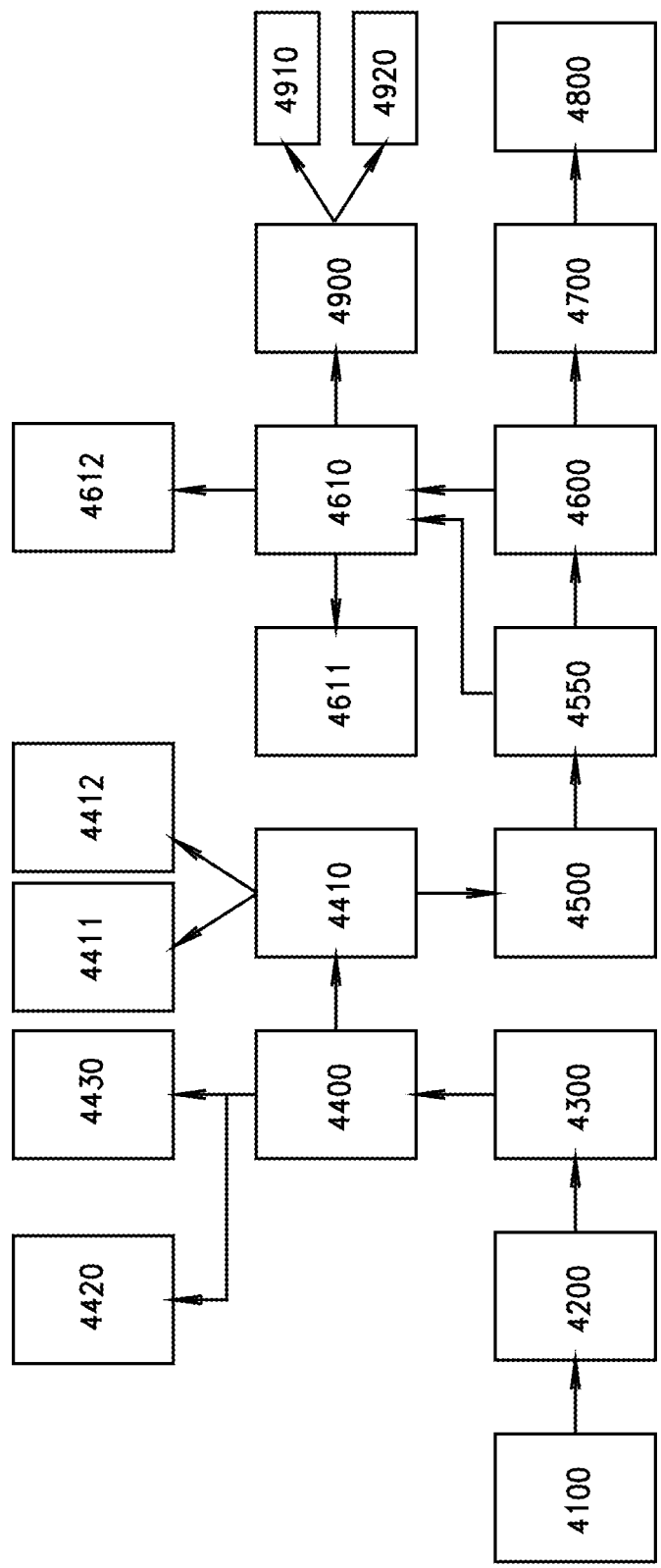
FIG. 2 is a schematic representation of an exemplary process for ethanol manufacturing that depend on dry grain milling and incorporates the grain fractionation process of the present description.

Implementation of the GFP as generally described above into a fermentation process is a straightforward matter. A generalized dry grain milling and ethanol manufacturing process is shown in FIG. 2, which shows the benefits of introducing the GFP prior to fermentation. Referring to FIG. 2, an agricultural product 4100, such as corn, undergoes a milling step 4200. The milling step 4200 can be a dry milling or a wet milling process, as is most appropriate for the agricultural product 4100 and the desired products. If the milling step 4200 is a wet milling process it may be followed by a series of routine mechanical separation steps. If the milling step 4200 is a dry milling process, then the process proceeds to a liquefying step 4300. The liquefying step 4300 can also be a liquefaction. The liquefying step 4300 is a process in which the milled agricultural product 4100 is mixed with water and enzymes, then heated to break down complex starch molecules into simpler, fermentable sugars.

The process then proceeds to a grain fractionation process (GFP) step 4400. In various exemplary embodiments, the GFP step 4400 can also be an integral part of the liquefying step 4300, but as described here, the GFP step 4400 proceeds after the liquefying step 4300. As described above with respect to FIG. 1, the GFP generally results in the combined retentate stream 135, which can comprise a protein product 4420 and a fiber product 4430, and a first soluble matter stream 130, which can include a carbohydrates content 4410, each of these can be further processed to enhance their purities and qualities. For example, the carbohydrates content 4410 can be further processed in order to achieve a high quality sugar product 4411 and/or a primary oil recovery product 4412. The high quality sugar product 4411 is composed of sugars that result from the breakdown of starches in the agricultural product 4100. In various exemplary embodiments, the high quality sugar product 4411 comprises sugars that are readily metabolized by microorganisms, such as glucose and maltose. The primary oil recovery product 4412 comprises one or more grain oils found in the agricultural product 4100. For example, if the agricultural product 4100 is corn, the primary oil recovery product 4412 can comprise triglycerides rich in linoleic acid along with oleic and palmitic acids. In various exemplary embodiments, the primary oil recovery product 4412 can also comprise valuable oil-phase components such as tocopherols and plant sterols. A traditional fermentation medium preparation process that does not include the GFP step 4400 as described herein therefore does not achieve the protein product 4420, the fiber product 4430 or any products from the carbohydrates content 4410, such as the high quality sugar product 4411 and/or the primary oil recovery product 4412.

After the GFP step 4400, the first soluble matter stream 130 can proceed to a fermentation step 4500, although in various exemplary embodiments, additional process steps known to one of ordinary skill in the art, such as membrane filtration, can be used to further enhance its purity prior to fermentation. During the fermentation step 4500, yeast metabolizes the simple sugars in the first soluble matter stream 130 into ethanol and carbon dioxide under controlled temperature conditions. The fermentation step 4500 continues until most available sugars are consumed, creating fermentation output 4550. The fermentation output 4550 comprises a beer-like liquid mixture called "beer" or "wash" that primarily comprises fermentation products such as ethanol and a microbial biomass. In various exemplary embodiments, the fermentation output 4550 includes a microbial biomass in the form of a yeast biomass. The microbial biomass is in various exemplary embodiments the natural result of the fermentation step 4500, as fermentation can be understood as the growth of a population of a microbial biomass in order to generate desirable products.

The use of genetically-modified organisms (GMOs) can engender a modified version of the microbial biomass that generates non-ethanol products during fermentation. For example, the microorganisms that convert the sugars in the carbohydrate content 4410 to ethanol during the fermentation step 4500 can be modified microorganisms that also produce specific desired compounds as their population grows during fermentation. As a non-limiting example, yeast can be modified to produce higher yields of desirable compounds like vitamins, proteins, and acids-either by introducing new metabolic products or by enhancing the yeast's natural metabolic pathways for greater efficiency. Thus, the microbial biomass can be one that produces vitamins, proteins, acids, and other desirable compounds. Vitamins that can be produced by the microbial biomass via genetic engineering include but are not limited to riboflavin (B2), biotin (B7), thiamine (B1), vitamin B12 (cobalamin), ergocalciferol (D2), beta-carotene (provitamin A), pantothenic acid (B5), pyridoxine (B6), and folic acid (B9). Proteins that can be produced by the microbial biomass via genetic engineering include but are not limited to single cell protein (SCP), lysine, threonine, tryptophan, insulin, human serum albumin, interferons, growth factors, antibody fragments, collagen, and industrial enzymes like amylases, proteases, and lipases. Acids that can be produced by the microbial biomass via genetic engineering include but are not limited to citric acid, lactic acid, succinic acid, itaconic acid, fumaric acid, malic acid, gluconic acid, propionic acid, and various amino acids including glutamic acid, aspartic acid, and gamma-aminobutyric acid (GABA).

It must be noted that the above-highlighted use of modified versions of the microbial biomass is made possible and industrially feasible by the process described herein, and particularly by the use of the GFP step 4400. The products that can be generated with the use of modified versions of the microbial biomass are less a function of the agricultural product 4100 and more a function of the specific microbial biomass. However, the use of GMOs is generally stronglyregulated for a wide variety of reasons, and thus, existing industrial plants that process agricultural products for fermentation are often practically prohibited (or at least sufficiently discouraged) from incorporating such GMOs into their plant processes. One significant concern for many such existing plants is that any GMOs used during fermentation may then contaminate their fiber and protein products, and thus could adversely affect much or all of their product lines. As can be appreciated from the above description and as is further detailed below, the process described herein, which includes the GFP step 4400, separates out the high quality sugar product 4411 and the primary oil recovery product 4412 prior to the fermentation step 4500, thereby eliminating risk of contaminating the high quality sugar product 4411 and the primary oil recovery product 4412 with any GMOs in the microbial biomass. Additionally, the fermentation step 4500 itself benefits strongly from the significantly more pure and clean fermentation medium that comes from the GFP step 4400. Thus, the process described herein can be easily incorporated into existing industrial fermentation plants and result in various isolated product streams, wherein fiber and protein product streams from the agricultural product 4100 are under no risk of contamination, and further wherein the products of fermentation are more significantly controlled by genetic modification of the microbial biomass than by the composition of the agricultural product 4100 itself.

By corollary, the fermentation step 4500 can include additional processing in order to induce modified versions of the microbial biomass to generate one or more desired products. Such additional processing can require particular conditions, reagents, promoters, and/or other additives. For example, the use of modified versions of the microbial biomass to produce vitamins may require the addition of specific amino acids or minerals as cofactors.

In various exemplary embodiments, the fermentation output 4550 can proceed directly to a biomass separation step 4610 and there undergo further processing and/or separation to separate the microbial biomass from the other fermentation products such as ethanol. The results of the biomass separation step 4610 are further detailed below. The biomass separation step 4610 can include additional processing in order to induce modified versions of the microbial biomass to generate one or more desired products. Such additional processing can require particular conditions, reagents, promoters, and/or other additives. The choice of whether additional processing occurs during the fermentation step 4500 or during the biomass separation step 4610 can be decided on the basis of whether such additional processes are better suited to reaction conditions before or after distillation.

In various exemplary embodiments, the fermentation output 4550 proceeds to a distillation step 4600. During the distillation step 4600, the fermentation output 4550 of the GFP step 4400 can be heated to separate and concentrate ethanol through evaporation and condensation, producing a more purified ethanol product. In various exemplary embodiments, after distillation, the distilled ethanol and other fermentation products are separated from the microbial biomass in the biomass separation step 4610. Thus, in other words, in varying embodiments, the biomass separation step 4610 can occur before or after the distillation step 4600. The purified ethanol product that is output from the distillation step 4600 can then proceed to a dehydration step 4700.

In the dehydration step 4700, the purified ethanol product that is output from the distillation step 4600 is processed to remove any remaining water, resulting in a pure ethanol product 4800.

In the biomass separation step 4610, the microbial biomass is separated from other fermentation products such as ethanol. The separated microbial biomass and other fermentation products can bother undergo a purification step 4900, wherein any additional impurities are removed according to any means known to one of ordinary skill in the art, resulting in a microbial biomass product 4910 and a fermentation products stream 4920. As described above, the biomass separation step 4610 can also include the use of reagents, additives, and/or specific reaction conditions (such as pH, temperature, and pressure) to process the microbial biomass to generate useful products. The use of genetically-modified organisms to process the microbial biomass during the biomass separation step 4610 can result in the recovery of an alternative oil product 4611, a distiller's syrup 4612, and/or any product that can be generated by a modified version of the microbial biomass.

As can be seen above, only by inclusion of the novel GFP step 4400 can the one achieve the carbohydrates product 4410, the protein product 4420, and the fiber product 4430. Additionally, separation of products at the GFP step 4400 ensures that the carbohydrates product 4410, the protein product 4420, and the fiber product 4430 are not modified or contaminated by the subsequent fermentation step 4500, nor are the fermentation step 4500 or subsequent steps contaminated or modified by the presence of the undesirable components of the carbohydrates product 4410, the protein product 4420, and the fiber product 4430. The carbohydrate product 4410 can be used in fermentation step 4500.

Figure 3:
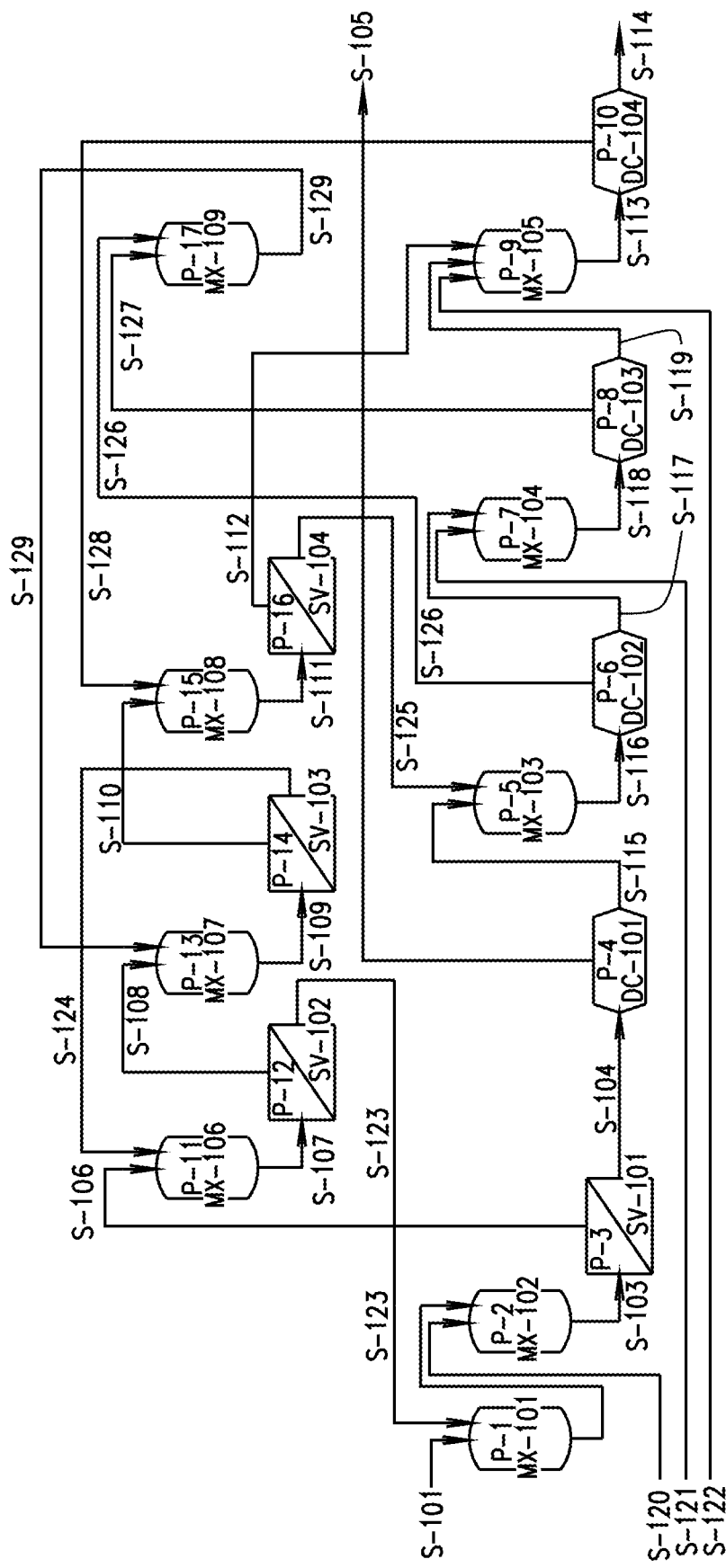
FIG. 3 is a detailed schematic representation of an exemplary embodiment of the grain fractionation process of the present description.

A detailed exemplary schematic of the GFP process as described herein is provided in FIG. 3. As the process depicted in FIG. 3 includes multiple branching and rejoining processes, the following description will focus on four primary process stages: principal carbohydrate recovery, residual carbohydrate recovery, principal biomass recovery, and recovered residual glucose recycling.

Principal Carbohydrate Recovery

In brief, the principal carbohydrate recovery stage comprises four steps. First, a primary input stream comprising biomass solids and dissolved carbohydrates is combined with one or more additional streams over the course of one or more mixers in order to generate a more diluted stream that has a higher concentration of dissolved carbohydrates such as glucose. This stream is then processed through one or more separators such as centrifugal sieves in order to recover a carbohydrate-rich stream with a relatively low or very low concentration of biomass solids.

Referring to FIG. 3, the principal carbohydrate recovery stage comprises three steps labeled as P-1, P-2, and respectively. A primary input stream S-101 is sent to a first mixer P-1/MX-101. The primary input stream S-101, in various exemplary embodiments, comprises corn flour suspended represented as biomass solids and dissolved carbohydrates. In various exemplary embodiments, the primary input stream S-101 comprises corn flour 0-36% dry solids, which can in general be represented as 18-25% suspended biomass solids and 65-85% carbohydrates such as glucose. The first mixer P-1/MX-101 combines the primary input stream S-101 with a first recycled process waters stream S-123 forming liquified corn mash. The first mixer P-1/MX-101 thus reduces the density of the solids in the primary input stream S-101 and enhances recovery of the glucose. The output of the first mixer P-1/MX-101 is a secondary stream S-102.

The secondary stream S-102 then proceeds to a second mixer P-2/MX-102 in some embodiments. In the second mixer P-2/MX-102, the secondary stream S-102 is mixed with an additional process stream S-120 which may contain specific enzymes to enhance processing and to further dilute the secondary stream S-102. A resulting third stream S-103 that is output from the second mixer P-2/MX-102 is significantly reduced in biomass solids concentration and still comprises glucose. In various exemplary embodiments, the third stream S-103 comprises approximately 5-10% w/w biomass and approximately 25-30% w/w dissolved carbohydrates such as glucose. In various exemplary embodiments, the third stream S-103 comprises 5.05% w/w biomass and 24.19% w/w dissolved carbohydrates such as glucose. In various exemplary embodiments, the third stream S-103 comprises between 2% w/w biomass and 10% w/w biomass and between 10% w/w dissolved carbohydrates such as glucose and 50% w/w dissolved carbohydrates such as glucose. In various exemplary embodiments, the third stream S-103 comprises approximately or exactly 1%, 2%, 3%, 4%, 5%, 6%, 7%, 8%, 9%, or 10% w/w biomass and approximately or exactly 15%, 16%, 17%, 18%, 19%, 20%, 21%, 22%, 23%, 24%, 25%, 26%, 27%, 28%, 29%, 30%, 31%, 32%, 33%, 34%, or 35% w/w dissolved carbohydrates such as glucose.

The third stream S-103 then proceeds to a primary centrifugal sieve P-3/SV-101. The primary centrifugal sieve P-3/SV-101 uses rotational force and a mesh or screen to separate materials of different sizes or densities. The rotation creates centrifugal force that pushes material outward through the screen while retaining larger particles. Two streams result as outputs of the primary centrifugal sieve P-3/SV-101: a fourth stream S-104 and a sixth stream S-106. The fourth stream S-104 primarily comprises simple carbohydrates such as glucose and a significantly reduced quantity of biomass solids. In various exemplary embodiments, the fourth stream S-104 comprises approximately 25-30% carbohydrates and approximately 2.5-6% biomass solids. The sixth stream S-106 comprises a greater quantity of biomass solids than the fourth stream S-104, and also comprises a concentration of simple carbohydrates. In various exemplary embodiments, the sixth stream S-106 contains approximately equal concentrations of biomass solids and carbohydrates. In various exemplary embodiments, the sixth stream S-106 contains approximately 18-30% biomass w/w and 18-30% w/w carbohydrates. In various exemplary embodiments, the sixth stream S-106 contains 18% biomass w/w and 21% w/w carbohydrates.

The fourth stream S-104 proceeds to a first centrifugal separator P-4/DC-101, where "DC" is short for 'decanter centrifuge.' The first centrifugal separator P-4/DC-101 separates carbohydrates from biomass solids in the fourth stream S-104 and results in a fifth stream S-105 and a fifteenth stream S-115. The fifth stream S-105 comprises simple carbohydrates such as glucose and a significantly reduced quantity of biomass solids. In various exemplary embodiments, the fifth stream S-105 comprises approximately 25% carbohydrates and approximately 1-4% biomass solids. In various exemplary embodiments, the fifth stream S-105 comprises approximately 91% of the carbohydrates concentration in the fourth stream S-104 and approximately 40% of the biomass solids concentration in the fifth stream S-104. The fifteenth stream S-115 comprises biomass solids and carbohydrates. In various exemplary embodiments, the fifteenth stream S-115 comprises approximately 22% carbohydrates and approximately 14% biomass solids. In various exemplary embodiments, the fifteenth stream S-115 comprises approximately 21.79% carbohydrates and approximately 14.46% biomass solids. The fifth stream S-105 is thus a concentrated carbohydrates stream. The fifteenth stream S-115 undergoes further processing to recover dissolved carbohydrates and is later reintroduced to the front of the process at the first mixer P-1/MX-101 as the first recycled process waters stream S-123.

Residual Carbohydrates Recovery

In brief, the residual carbohydrates recovery stage comprises five steps. An output stream from the primary carbohydrates recovery stage that comprises both biomass solids and dissolved carbohydrates is alternately mixed with at least one water or dilute process waters stream and then separated in a device such as a centrifugal separator at least once. In various exemplary embodiments, this sequence of dilution and subsequent separation occurs 1, 2, 3, 4, 5 or more times. The end result is a recovery stream of dilute processing waters that are fed back into the overall process as well as a stream rich in biomass solids.

Referring to FIG. 3, the residual carbohydrates recovery stage comprises five steps, labeled P-5, P-6, P-7, P-8, P-9 and P-10, respectively. The fifteenth stream S-115 proceeds to a third mixer P-5/MX-103, where the fifteenth stream S-115 is combined with a principal residual glucose stream S-125, which is obtained at the end of the principal biomass recovery stage detailed below. The output of the third mixer P-5/MX-103 is an integrated stream S-116 that principally comprises dissolved carbohydrates, such as glucose, and biomass solids. In various exemplary embodiments, the integrated stream S-116 comprises 3-5% w/w glucose and 1-5% w/w biomass solids. The combination of the fifteenth stream S-115 and the principal residual glucose stream S-125 into the integrated stream S-116 allows for the recovery of residual dissolved carbohydrates from biomass processing without otherwise concomitant loss of carbohydrates in biomass stream and improves the water balance in the stream, maintaining consistent water volumes with respect to each part of the process.

The integrated stream S-116 then proceeds to a second centrifugal separator P-6/DC-102. The second centrifugal separator P-6/DC-102 enables the centrifugal separation of the components of the integrated stream S-116 into a first residual carbohydrates stream S-126 and a first residual biomass stream S-117. The first residual carbohydrates stream S-126 has a concentration of carbohydrates and a relatively very low concentration of biomass solids. In various exemplary embodiments, the first residual carbohydrates stream S-126 comprises approximately 3-5% w/w carbohydrates and approximately 0-3% w/w biomass solids. In various exemplary embodiments, the first residual carbohydrates stream S-126 comprises 3.45% w/w glucose and approximately 0.01-1% w/w biomass solids. The first residual biomass stream S-117 principally comprises biomass solids and a smaller concentration of dissolved carbohydrates. In various exemplary embodiments, the first residual biomass stream S-117 comprises approximately 3% w/w carbohydrates and approximately 18% w/w biomass solids. In various exemplary embodiments, the first residual biomass stream S-117 comprises 2-5% w/w glucose and 15-18% w/w biomass solids.

The first residual biomass stream S-117 then proceeds to a fourth mixer P-7/MX-104, where the first residual biomass stream S-117 is mixed with and diluted by a freshwater stream S-121 which principally comprises fresh water. The result is a diluted residual biomass stream S-118 which is the output of the fourth mixer P-7/MX-104. In various exemplary embodiments, the diluted residual biomass stream S-118 comprises approximately 7.5% w/w biomass solids and 1.2% w/w of dissolved carbohydrates such as glucose. The dilution that occurs in the fourth mixer P-7/MX-104 is critical to enable the complete separation of dissolved carbohydrates such as glucose from the biomass fraction, as occurs in a third centrifugal separator P-8/DC-103, because the dilution enhances the washing of the biomass solids and helps maintain water balance across the process.

The diluted residual biomass stream S-118 proceeds to the third centrifugal separator P-8/DC-103, which uses mechanical centrifugal separation to recover additional residual dissolved carbohydrates such as glucose from the diluted residual biomass stream S-118. The result is a heavy fraction stream S-119 and a light fraction stream S-127. The heavy fraction stream S-119 principally comprises biomass solids. In various exemplary embodiments, the heavy fraction stream S-119 comprises approximately 15-18% w/w biomass solids. The light fraction stream principally comprises 0.1-2% of dissolved carbohydrates. The P8 step is critical for maintaining the liquids balance in the overall GFP process and ensures that the end result of the P-5, P-6, P-7 and P-8 processes is a recovery of almost all of residual biomass.

The heavy fraction stream S-119 then proceeds to a fifth mixer P-9/MX-105, where it is combined with a fresh water stream S-122, which principally comprises fresh water, and a principal biomass stream S-112, which is detailed below with respect to the principal biomass recovery stage. The output of the fifth mixer P-9/MX-105 is a combined heavy fraction stream S-113. The combined heavy fraction stream S-113 has a relatively high biomass solids concentration but a relatively very low concentration of dissolved carbohydrates such as glucose. In various exemplary embodiments, the concentration of biomass solids in the combined heavy fraction stream S-113 is approximately 6.1%, while the concentration of dissolved carbohydrates such as glucose in the combined heavy fraction stream S-113 is less than 1%. The fifth mixer sets the stage for recovery of terminal residual dissolved carbohydrates such as glucose in a fourth centrifugal separator P-10/DC-104, as described below, and enables maintenance of the liquids balance for the overall process depicted in FIG. 5.

The last traces of dissolved carbohydrates such as glucose are removed from the combined heavy fraction stream S-113 in the fourth centrifugal separator P-10/DC-104, which receives the combined heavy fraction stream S-113 as an input. The outputs of the centrifugal separation in the fourth centrifugal separator P-10/DC-104 are a biomass fraction S-114, which is recovered, and a bulk process liquids stream S-128, which is reintegrated into the overall process depicted in FIG. 3 at an eighth mixer P-15/MX-108 as described below in the principal biomass recovery stage. The biomass fraction S-114, in various exemplary embodiments, principally comprises undissolved biomass solids. In various exemplary embodiments, the biomass fraction S-114 comprises approximately 30% w/w biomass solids and approximately 1% w/w or less of dissolved carbohydrates.

Principal Biomass Recovery

The principal biomass recovery stage is engineered to obtain a biomass-rich stream that comprises relatively very low concentrations of residual carbohydrates. As such, the principal biomass recovery stage recycles process streams in a sequence of multiple dilutions and washing/separation steps that partly form a closed loop.

The sixth stream S-106 is channeled into a sixth mixer P-11/MX-106, which also receives as input a second recycled process waters stream S-124. The second recycled process waters stream S-124 comprises a residual concentration of dissolved carbohydrates. In various exemplary embodiments, the second recycled process waters stream S-124 comprises approximately 2-5% w/w residual carbohydrates such as glucose. Mixing of the input streams occurs in the sixth mixer P-11/MX-106 in order to initiate the separation of biomass solids from dissolved carbohydrates in the sixth stream S-106. The output of the sixth mixer P-11/MX-106 is a first enriched carbohydrates stream S-107. In various exemplary embodiments, the first enriched carbohydrates stream S-107 comprises approximately twice as much dissolved carbohydrates as biomass solids in w/w percentage. In various exemplary embodiments, the first enriched carbohydrates stream S-107 comprises approximately 7.02% w/w dissolved carbohydrates and approximately 3.47% w/w biomass solids. Although it may appear counterintuitive to remove residual glucose with a step that mixes inputs to arrive at the enriched carbohydrates stream S-107 that comprises a higher concentration of glucose, as described below, the downstream effect of this process is the removal of residual glucose.

The enriched carbohydrates stream S-107 is then transferred to a second centrifugal sieve P-12/SV-102, where the enriched carbohydrates stream S-107 is separated into the first recycled process waters stream S-123, which contains a relatively high concentration of residual dissolved carbohydrates, and an initial biomass stream S-108. The first recycled process waters stream S-123, in various exemplary embodiments, comprises a slightly higher level of dissolved carbohydrates than the enriched carbohydrates stream S-107. The first recycled process waters stream S-123, in various exemplary embodiments, comprises approximately 7.27% w/w dissolved carbohydrates such as glucose. The first recycled process waters stream S-123 serves as the principal route by which recovered residual carbohydrates such as glucose are reintegrated to the process in the first mixer P-1/MX-101. The initial biomass stream S-108 comprises biomass solids at a higher concentration than carbohydrates in w/w percentage. In various exemplary embodiments, the initial biomass stream S-108 comprises approximately four times as much biomass solids as carbohydrates in w/w percentage. In various exemplary embodiments, the initial biomass stream S-108 comprises approximately 20% w/w biomass solids and 5.82% w/w residual carbohydrates such as glucose.

The initial biomass stream S-108 is then directed into a seventh mixer P-13/MX-107, which also receives as input a washed residual stream S-129, the creation of which is detailed below. The initial biomass stream S-108 and the washed residual stream S-129 are mixed in the seventh mixer P-13/MX-107. In various exemplary embodiments, the washed residual stream S-129 primarily comprises carbohydrates such as glucose and a trace quantity of biomass solids. In various exemplary embodiments, the washed residual stream S-129 comprises approximately 3-5% w/w carbohydrates such as glucose and 1% w/w of biomass solids. The output of the seventh mixer P-13/MX-107 is a secondary biomass stream S-109. The secondary biomass stream S-109, in various exemplary embodiments, comprises approximately equal concentrations of dissolved carbohydrates such as glucose and biomass solids measured in w/w percentage. The secondary biomass stream S-109, in various exemplary embodiments, comprises approximately 3.62% w/w of dissolved carbohydrates such as glucose and 3.53% w/w of biomass solids.

The secondary biomass stream S-109 is then separated into two fractions by passing through a third centrifugal sieve P-14/SV-103. The third centrifugal sieve P-14/SV-103 operates much like the first centrifugal sieve P-3/SV-101 and the second centrifugal sieve P-12/SV-102 in using mechanical separation through centrifugation. The outputs of the third centrifugal sieve P-14/SV-103 are the second recycled process waters stream S-124, which contains residual glucose, and a tertiary biomass stream S-110 that principally comprises biomass solids. In various exemplary embodiments, the tertiary biomass stream S-110 comprises more than four times as much biomass solids as residual carbohydrates such as glucose measured in w/w percentage. In various exemplary embodiments, the tertiary biomass stream S-110 comprises approximately 20% w/w biomass solids and 3% w/w residual carbohydrates such as glucose. As described above, the second recycled waters stream S-124 is channeled back to the sixth mixer P-11/MX-106. The tertiary biomass stream S-110 proceeds to an eighth mixer P-15/MX-108 for dilution.

The tertiary biomass stream S-110 is diluted in the eight mixer P-15/MX-108 by mixing with the bulk process liquids stream S-128, which is the output of the fourth centrifugal separator P-10/DC-104 as described above. In various exemplary embodiments, the bulk process liquids stream S-128 comprises only trace amounts of residual carbohydrates such as glucose and trace amounts of biomass solids. In various exemplary embodiments, the bulk process liquids stream S-128 comprises approximately 0.2-1% w/w carbohydrates such as glucose and 0.75-1% w/w biomass solids. Thus, the bulk process liquids stream S-128 effectively dilutes the tertiary biomass stream S-110 in the eighth mixer P-15/MX-108, resulting in an output of a combined biomass stream S-111. In various exemplary embodiments, the combined biomass stream S-111 comprises trace residual carbohydrates and a concentration of biomass solids. In various exemplary embodiments, the combined biomass stream S-111 comprises approximately 0.5-1% w/w residual carbohydrates such as glucose and approximately 4-5% w/w biomass solids.

The combined biomass stream S-111 is then transferred to a fourth centrifugal sieve P-16/SV-104, where the combined biomass stream S-111 is separated into two output streams: the principal residual glucose stream S-125 and the principal biomass stream S-112. In various exemplary embodiments, the principal residual glucose stream S-125 comprises trace amounts of residual carbohydrates such as glucose and trace amounts of biomass solids, and serves as the principal route for integrating the principal biomass recovery stage with the residual carbohydrate recovery stage by inputting the principal residual glucose stream S-125 into the third mixer P-5/MX-103. In various exemplary embodiments, the principal residual glucose stream S-125 comprises approximately 0.83% w/w residual carbohydrates such as glucose and approximately 0.06% w/w biomass solids. The principal biomass stream S-112 contains most of the biomass solids in the exemplary grain fractionation process depicted in FIG. 3. In various exemplary embodiments, the principal biomass stream S-112 comprises approximately 74% w/w of the washed biomass fraction obtained by the grain fractionation process depicted in FIG. 3.

Recovered Residual Glucose Recycling

The first residual carbohydrates stream S-126 and the light fraction stream S-127 are channeled as inputs into a ninth mixer P-17/MX-109. The ninth mixer P-17/MX-109 combines the first residual carbohydrates stream S-126 and the light fraction stream S-127 to form the washed residual stream S-129, which is then channeled back into the principal biomass recovery stage, and particularly, in the exemplary schematic of FIG. 3, into the seventh mixer P-13/MX-107.

Example 2

Industrial Application of GFP

Figure 4:
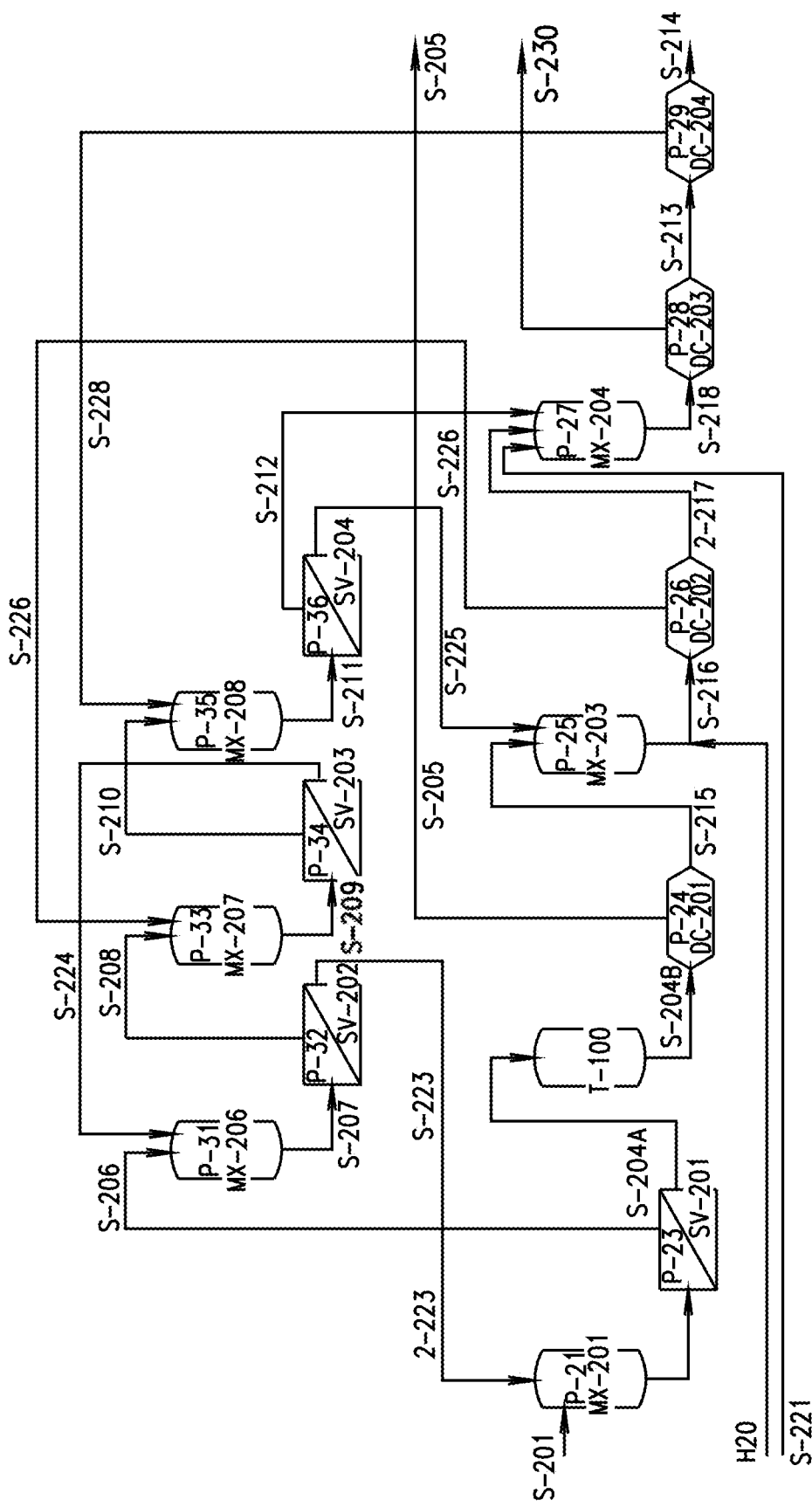
FIG. 4 is a detailed schematic representation of an exemplary embodiment of the integrated grain fractionation process of the present description integrated into an industrial application.

A detailed exemplary schematic of an industrial application of the GFP process as described herein is provided in FIG. 4.

The process shown in FIG. 4 begins with a primary input stream S-201, which comprises milled agricultural products such as grain flours suspended in a mixture that includes biomass solids and dissolved carbohydrates. The primary input stream S-201, in various exemplary embodiments, comprises corn flour in 0-36% dry solids by weight percentage. In various exemplary embodiments, the primary input stream S-201 is 18-25% suspended biomass solids and 65-85% carbohydrates such as glucose. The primary input stream S-201 proceeds to a first mixing step P-21/MX-201. The first mixing step P-21/MX-201, and indeed all mixing steps described herein, comprises any device known to one of ordinary skill to be appropriate for mixing multiple input streams. There, the primary input stream S-201 is mixed with a terminal recycling stream S-223, which mostly comprises water and is generated at a step described below in the process depicted in FIG. 4.

This first mixing step P-21/MX-201 essentially represents the grain liquefaction process that is depicted in FIG. 2 as the liquefying step 4300, where various streams are integrated to provide for preparation of liquified grain mash. In various exemplary embodiments, the output of the first mixer P-21/MX-201 is a mash stream S-203 that is primarily comparable in composition to the depiction in FIG. 3 of the third stream S-103 or, more generally, to the liquid mash 110 depicted in FIG. 1.

The mash stream S-203 proceeds to a first fractionation step P-23/SV-201. The first fractionation step P-23/SV-201 fractionates the mash stream S-203 to a first recycling stream S-206 and a first fractionation stream S-204A. In various exemplary embodiments, the first recycling stream S-206 contains approximately equal concentrations of biomass solids and carbohydrates. In various exemplary embodiments, the first recycling stream S-206 contains approximately 18-30% biomass w/w and 18-30% w/w carbohydrates. In various exemplary embodiments, the first recycling stream S-206 contains 18% biomass w/w and 21% w/w carbohydrates.

The first fractionation stream S-204A then proceeds to a feed tank T-100. In various exemplary embodiments, the feed tank T-100 can serve as a buffer tank or dilution vessel for one or more other streams in order to allow for the optimal operation of the primary carbohydrate recovery path. A process feed stream S-204B is output from the feed tank T-1.

The primary separation of carbohydrate contained in the process feed stream S-204B proceeds to a first separation step P-24/DC-201, which includes a mechanical centrifuge or similar separation device allowing for separation of most liquified carbohydrate materials as a primary carbohydrates stream S-205 from residual biomass solids as first residual biomass stream S-215. The use of mechanical centrifugation in the first separation step P-24/DC-201 or similar device allows for separation of carbohydrate materials from biomass solids resulting in the production of the primary carbohydrates stream S-205, which, in various exemplary embodiments, is a concentrated glucose rich carbohydrate stream primarily composed of glucose ~25% w/w or, put another way, 90% out of 100% of total glucose present in the primary input stream S-201. In various exemplary embodiments, the biomass concertation in the primary carbohydrates stream S-205 is approximately 1% w/w or, put another way, 1% to 40.00% out of 100% of total biomass present in the primary input stream S-201. The first residual biomass stream S-215, in various exemplary embodiments, contains concentrated biomass solids fraction 10-20% w/w and residual glucose 15-25% w/w that undergoes additional bioprocessing to recover dissolved carbohydrates and reintroduce them to the front of the process as the terminal recycle stream S-223.

The first residual biomass stream S-215 is then washed in a second mixing step P-25/MX-203, where the first residual biomass stream S-215 is mixed with a process stream S-225 that is output from the second mixing step P-26/SV-204. The resulting output of the second mixing step P-25/MX-203 is a second residual biomass stream S-216. The second mixing step P-25/MX-203, which mixes the residual biomass stream S-215 and the process stream S-225, allows for use of the recycle streams to prepare for fractionation of the residual carbohydrates contained in the second residual biomass stream S-216.

The second residual biomass stream is then mixed with a water stream H2O, which principally comprises water. In alternative embodiments, the water stream H2O can mix with the residual biomass stream S-215 and the process stream S-225 directly during the second mixing step P-25/MX-203. The incorporation of the water stream H2O enables maintenance of water balance in the overall process depicted in FIG. 4.

The second residual biomass stream S-216 then proceeds to a second separation step P-26/DC-202, where centrifugal separation takes place, or any other mechanical separation known to one of ordinary skill in the art. The centrifugal separation of the second residual biomass stream S-216 during the second separation step P-26/DC-202 is intended to enable recovery of residual carbohydrates present in the second residual biomass stream S-216. Thus, two streams output from the second separation step P-26/DC-202: a third residual biomass stream S-217, which is characterized by comprising a relatively higher concentration of biomass solids of the two output streams from the second separation step P-26/DC-202, and a first residual carbohydrates stream S-226, which principally comprises the residual carbohydrates that are separated from the residual biomass solids from the second residual biomass stream S-216.

The third residual biomass stream S-217 proceeds to a third mixing step P-27/MX-204, where, in any mixer known to one of ordinary skill in the art, the third residual biomass stream S-217 is mixed with a primary biomass stream S-212 and a fresh water stream S-221, which principally comprises fresh water. The purpose of the third mixing step P-27/MX-204 is to consolidate the biomass solids recovered in the overall fractionation process, begin to recover any remaining residual carbohydrates, and maintain adequate water balance while preparing for solid products such as fiber and proteins to be removed from the process. The third mixing step P-27/MX-204 therefore has one output stream: a consolidated biomass stream S-218.

The consolidated biomass stream S-218 proceeds to a third separation step P-28/DC-203, where centrifugal separation takes place, or any other mechanical separation known to one of ordinary skill in the art. The centrifugal separation of the consolidated biomass stream S-218 during the third separation step P-28/DC-203 is intended to enable recovery of residual carbohydrates present in the consolidated biomass stream S-218 as well as to separate out a fiber-rich stream S-230. The fiber-rich stream S-230 primarily comprises biomass solids in the form of fibers. A processed biomass solids stream S-213 also results from the third separation step P-28/DC-203, and the processed biomass solids stream S-213 principally comprises biomass solids with a small amount of residual carbohydrates.

The processed biomass solids stream S-213 proceeds to a fourth separation step P-29/DC-204, where centrifugal separation takes place, or any other mechanical separation known to one of ordinary skill in the art. The centrifugal separation of the processed biomass stream S-213 during the fourth separation step P-29/DC-204 is intended to enable recovery of residual carbohydrates present in the processed biomass stream S-213 as well as to separate out a protein-rich stream S-214. The protein-rich stream S-214 primarily comprises biomass solids in the form of proteins. A residual carbohydrates stream S-228 also results from the fourth separation step P-29/DC-204, and the residual carbohydrates stream S-228 principally comprises water and residual carbohydrates.

Thus, the biomass solids are fractionated from the primary input stream S-201 and finally emerge as two output streams: the fiber-rich stream S-230 and the protein-rich stream S-214.

The first recycling stream S-206 that is generated from the first fractionation step P-23/SV-201 proceeds to a fourth mixing step P-31/MX-206, which serves as the first in a series of steps that recycle streams to maintain water balance in the overall process and aid in the recovery of carbohydrates and biomass solids. In the first fractionation step P-23/SV-201, the first recycling stream S-206 and a third recycling stream S-224. The third recycling stream S-224 in various exemplary embodiments principally comprises water and small amounts of carbohydrates. The fourth mixing step P-31/MX-206 results in a first diluted stream S-207 that is a more diluted version of the first recycling stream S-206.

The first diluted stream S-207 proceeds to a second fractionation step P-32/SV-202, which uses mechanical separation to separate the biomass solids from the carbohydrates in the first diluted stream S-207. The second fractionation step P-32/SV-202 results in two streams: the terminal recycling stream S-223, which is channeled to the mixer in the first mixing step P-21/MX-201, and a second recycling stream S-208. The second recycling stream S-208, in various exemplary embodiments, comprises biomass solids and carbohydrates.

The second recycling stream S-208 proceeds to a fifth mixing step P-33/MX-207, where the second recycling stream S-208 is mixed with the first residual carbohydrates stream S-226, which is output from the second mixing step P-26/DC-202. The fifth mixing step P-33/MX-207 further enables additional separation of biomass solids from carbohydrates by generating a second diluted stream S-209 that comprises biomass solids and carbohydrates, albeit at lower concentrations than present in the first diluted stream S-207.

The second diluted stream S-207 proceeds to a third fractionation step P-34/SV-203, which uses mechanical separation to separate the biomass solids from the carbohydrates in the second diluted stream S-209. The third fractionation step P-34/SV-203 results in two streams: the third recycling stream S-224 and a fourth recycling stream S-210 that comprises biomass solids and residual carbohydrates.

The fourth recycling stream S-210 proceeds to a sixth mixing step P-35/MX-208, where the fourth recycling stream S-210 is mixed with the residual carbohydrate stream S-228. The sixth mixing step P-35/MX-208 is the last in a series of washes intended to maintain water balance and secure residual carbohydrates while separating off biomass solids. A third diluted stream S-211 results from the sixth mixing step P-35/MX-208. The third diluted stream S-211 then proceeds to a fourth fractionation step P-36/SV-204.

The fourth fractionation step P-36/SV-204 uses mechanical separation to separate the remaining residual carbohydrates from the biomass solids in the third diluted stream S-211. There are two outputs of the fourth fractionation step: the process stream S-225 and the primary biomass stream S-212. The primary biomass stream S-212 comprises the bulk of the biomass solids washed and recovered in the prior sequence of mixing and separation steps.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A process for fractionation of a quantity of liquefied grains comprising insoluble biomass solids and soluble carbohydrates into a biomass solids fraction and a carbohydrates-rich fraction, wherein the process comprises:
   diluting the quantity of liquefied grains to obtain a diluted liquid mash, wherein the diluting is performed by mixing the quantity of liquefied grains with water or with a recycled soluble matter stream, wherein the recycled soluble matter stream is an aqueous solution of residual soluble carbohydrates recovered from a first bioprocessing stage;
   a first fractionation, wherein the first fractionation comprises mechanically processing the diluted liquid mash in a first fractionation stage to obtain a first retentate stream and a permeate stream, wherein the first retentate stream comprises the insoluble biomass solids and the residual soluble carbohydrates and wherein the permeate stream comprises the dissolved carbohydrates;
   mechanically processing the first retentate stream in a first bioprocessing stage to obtain a processed first retentate stream and the recycled soluble matter stream, wherein the recycled soluble matter stream comprises the residual soluble carbohydrates and wherein the processed first retentate stream comprises the insoluble biomass solids;
   collecting the dissolved carbohydrates to obtain the carbohydrates-rich fraction; and
   collecting the insoluble biomass solids to obtain the biomass solids fraction.

2. The process of claim 1, wherein prior to the step of diluting the quantity of liquefied grains, the insoluble biomass solids are between 25% and 45% of the mass of the quantity of liquefied grains and wherein the quantity of liquefied grains is a suspension.

3. The process of claim 1 wherein the carbohydrates-rich fraction comprises less than 1% insoluble biomass solids by mass.

4. The process of claim 1 wherein the permeate stream also comprises a quantity of undissolved solids, further comprising:
   a second fractionation, wherein the second fractionation comprises mechanically processing the permeate stream in a second fractionation stage to obtain a second retentate stream and a first soluble matter stream, wherein the second retentate stream comprises the quantity of undissolved solids and trace carbohydrates, and wherein the first soluble matter stream comprises the dissolved carbohydrates; and
   mechanically processing the second retentate stream in a second bioprocessing stage to obtain a processed second retentate stream and a second soluble matter stream, wherein the processed second retentate stream comprises the quantity of undissolved solids and wherein the second soluble matter stream comprises the trace carbohydrates; and
   channeling the second soluble matter stream to the first bioprocessing stage to be mechanically processed with the first soluble matter stream.

5. The process of claim 1 wherein the biomass solids fraction comprises a fiber fraction.

6. The process of claim 1 wherein the biomass solids fraction comprises a protein fraction.

7. The process of claim 1 wherein the at least one carbohydrates-rich fraction obtained during the step of collecting the dissolved carbohydrates comprises glucose.

* * * * *